United States Patent Office 3,636,133
Patented Jan. 18, 1972

3,636,133
EPOXY RESIN ADHESIVE COMPOSITIONS CONTAINING AN ISOCYANATE TERMINATED POLYURETHANE PREPOLYMER AND A CHAIN EXTENDER
Jerry Marvin Hawkins, Lake Jackson, Tex., assignor to The Dow Chemical Company, Midland, Mich.
No Drawing. Filed Nov. 17, 1969, Ser. No. 877,446
The portion of the term of the patent subsequent to Aug. 25, 1987, has been disclaimed
Int. Cl. C08g 47/00, 45/12
U.S. Cl. 260—824 EP    6 Claims

ABSTRACT OF THE DISCLOSURE

This invention is directed to thermosettable resin compositions comprising essentially an epoxy resin and between about 5 and 50 parts per hundred parts of epoxy resin of a reactive terminated urethane type polymeric modifier for such epoxy resin wherein such modifier is the reaction product of approximately two molar equivalents of an organic isocyanate, approximately one molar equivalent of a polymeric "backbone" material having an average molecular weight of from about 500 to 5000, which is terminated with an active hydrogen capable of reacting with said organic isocyanate and which contains flexibilizing groups in the main polymer chain, and approximately one molar equivalent of a "cappant" material of the general formula

where X and X' is SH, OH, NH$_2$ and COOH and R is alkyl, aryl, aliphatic, aromatic, and branched aliphatic; wherein such polymeric modifier has an average molecular weight of at least about 500 but less than about 5000 and is compatible with the epoxy resin; and wherein the modified epoxy resin compositions are particularly useful in adhesive formulations.

---

It is desirable to provide epoxy resin formulations which are capable of rapid curing to form essentially non-tacky, flexible, thermoset materials having excellent adhesion to metals. Heretofore, efforts to achieve such results have included the utilization of flexibilizing curing agents such as the polyamides or polysulfides; or alternately, incorporating small percentages of elastomeric polymeric materials that are compatible but not reactive with the epoxy resin or hardener.

The flexibilizing curing agents must be employed in a relatively high ratio to the amount of epoxy resin. This alters the physical properties of the cured products so as to reduce such values as the tensile strength and particularly the shear strength. On the other hand, the elastomeric polymers are added in small quantities so that the flexibility of the cured product is enhanced without reducing the physical strength properties. The small quantity added, however, does not allow improvement beyond the increase in flexibility. For example, such properties as peel strength of epoxy adhesives for metals, or physical properties at reduced temperatures in the range of −100° F., are not improved.

More recently, epoxy resins have been modified by forming the modifier "in situ" in the resin by the addition to a solid epoxy resin of a prepolymer such as an adduct of a polyol with an isocyanate in combination with a relatively low molecular weight scavenger compound such as a "capping agent." However, such solid epoxy resins often contain several aliphatic hydroxyl groups which preferentially react with the prepolymers to form undesirable gels.

It has been discovered, which discovery forms a part of the present invention, that a particular urethane type polymeric modifier may be added to a solid epoxy resin containing pendant hydroxyl groups, without reacting with such hydroxyl groups thereby eliminating undesirable gelation, while providing epoxy resin formulations which are capable of rapid curing to form essentially non-tacky, flexible, thermoset materials having excellent adhesion to metals.

The improved epoxy resin adhesive compositions are prepared by addition to an epoxy resin, prior to curing thereof, from about 5 to 50 parts, and preferably between 20 and 40 parts per hundred parts of epoxy resin, of a reactive terminated urethane type polymeric modifier which is the reaction product of two equivalents of an organic isocyanate with one equivalent of a polymeric "backbone" material which is terminated with an active hydrogen capable of reaction with the organic isocyanate and wherein such "backbone" material contains flexibilizing groups in its polymeric chain, has an average molecular weight of from about 500 to 5000 and is compatible with the epoxy resin; and a "cappant" material of the general formula

where X and X' is SH, OH, NH$_2$ and COOH and R is alkyl, aryl, aliphatic, aromatic and branched aliphatic.

Preferred polymeric modifiers have an average molecular weight of at least about 500 to provide the desired improvements in adhesion but not more than about 5000 to avoid viscosity and flow problems. Further, such polymeric modifiers must be compatible with the epoxy resins.

The urethane type polymeric modifiers are generally prepared by first reacting the organic isocyanate with the polymeric "backbone" material to form an isocyanate prepolymer. This isocyanate prepolymer is then reacted with the "cappant" material.

The general structure of the resulting polymeric modifier may be illustrated as follows:

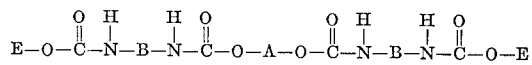

wherein A is the "backbone" polymer, B is an isocyanate forming the urethane moiety, and E is a capping agent.

The isocyanates which are employed are any of the aromatic isocyanates including: toluene diisocyanate, phenyl isocyanate, P,P'-diphenyl methane diisocyanate, P,P'-diphenyl oxide diisocyanate, P-phenylene diisocyanate; and any aliphatic isocyanate such as hexamethylene diisocyanate.

The polymeric "backbone" materials which are used include the following:

Polythiol polyurethanes: For example, polythiol polyurethane which is a propylene glycol initiated from glycerine and propylene oxide to a molecular weight of 3000 reacted with two equivalents of toluene diisocyanate and one equivalent of 2-hydroxy ethyl 2-mercapto propyl sulfide;

Polybutadiene acrylonitrile: For example, Hycar MTBN, a mercaptan terminated polybutadiene acrylonitrile that has 3 percent SH, is 1.6 functional, and has a molecular weight of around 1700; and Poly B–D CN–15 a hydroxy terminated butadiene-acrylonitrile polymer that is 85% butadiene, 15% acrylonitrile and has a hydroxy equivalent weight of 1430;

Polyesters: For example, a polyester which is a hydroxyl capped polyester from adipic acid and tripropylene glycol reacted to a molecular weight of 4500; and a hydroxyl capped polyester made from adipic acid and 1-4 butane diol reacted to a molecular weight of 2390;

Polybutadiene: For example, Poly B–D R–15M which is a polybutadiene containing 0.75 meq./gm. of hydroxy;

and the carboxylated polybutadienes having a molecular weight of about 2000;

Polyacrylates: For example, Polyacrylate MTA which is a mercaptan terminated polyacrylate containing about 1.89 percent SH; and the Silicones: For example, the hydroxyl capped silicone polymers having molecular weights of about 2000.

Examples of other useful general polymer types are: polysulfides, polymercaptans, polyamides, polyureas, acetals and polyvinyl acetate, vinyls and poly(vinyl ethers).

Examples of the flexible groups which may be present in such polymeric "backbone" materials are:

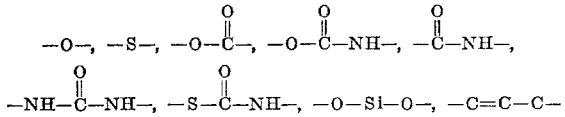

It is to be understood that the overall specific chemical make-up of such materials is not vital to the mechanical performance of the polymer chain; however, the presence or absence of flexible groups, such as listed above, influences the properties of the subsequently cured epoxy resin compositions.

The "cappant" materials used may be represented by the general formula:

X—R—X' where X and X' is SH, OH, $NH_2$, and COOH and R is alkyl, aryl, aliphatic, aromatic and branched aliphatics. Exemplary of such materials are:

Any mercapto alcohol such as:

4 mercapto butanol
3 mercapto butanol
1-5, mercapto pentanol

Any $NH_2$ containing carboxylic acid such as:

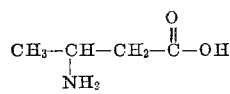

Any SH containing carboxylic acid such as:

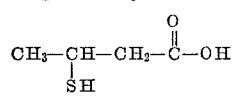

Any OH containing carboxylic acids such as:

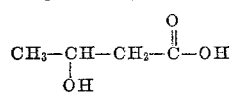

Dithiols such as:

Where $n$ can be from 1 to 7 and R can be alkyl, aryl, branched-chain, aliphatic, or aromatic.

Diamines such as:

Where $n$ can be from 1 to 7 and R can be alkyl, aryl, branched-chain, aliphatic, or aromatic.

Dicarboxylic acids such as:

HOOC—(R)$_n$—COOH

Where $n$ can be 1 to 7 and R can be alkyl, aryl, branched-chain, aliphatic, or aromatic.

Hydroxyl containing diglycidyl ether of glycerine:

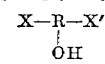

where R is a hydrocarbon radical and X and X' represent organic radicals containing reactive groups selected from the group consisting of oxirane, or thiirane such as:

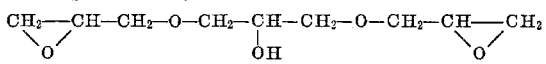

The modifiers described herein are useful as adhesion promoting agents for use with a wide variety of the common epoxy resins and epoxy resin mixtures including the glycidyl ethers of polyhydric phenols, bis-phenols, glycols, glycerine, polyoxyalkylene glycols, and the like, said epoxy resins being represented by the following formulae:

(A)

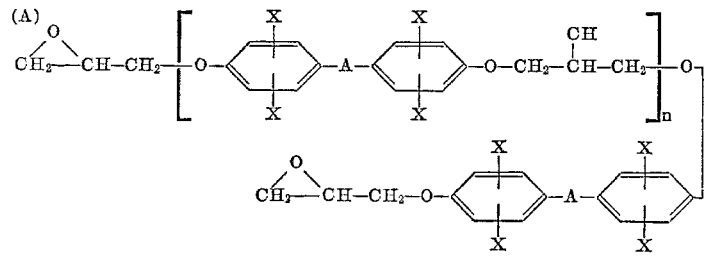

wherein A is selected from the group consisting of an alkylene group having from 1 to 4 carbon atoms,

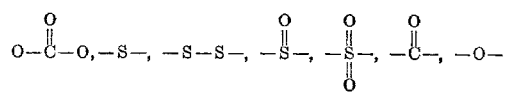

and the like, X is hydrogen or a halogen and $n$ is an integer having an average value of from about 0 to about 3;

(B)

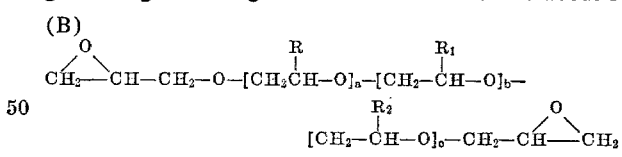

wherein R, $R_1$, and $R_2$ are independently hydrogen, an alkyl or haloalkyl group having from about 1 to about 4 carbon atoms, and $a$, $b$, and $c$ are integers, the sum of which is an integer having an average value of from about 3 to 40;

(C)

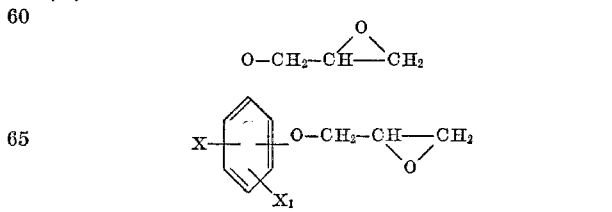

Wherein X and $X_1$ are independently selected from the group consisting of hydrogen and a halogen.

(D)

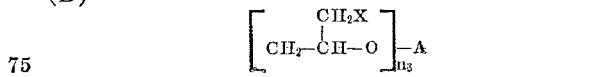

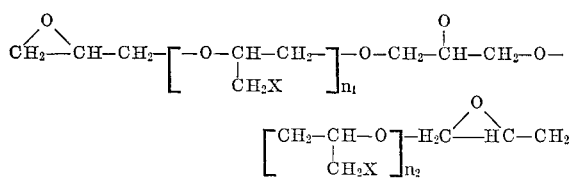

Wherein $n_1$, $n_2$ and $n_3$ are integers, the sum of which is an integer having an average value of from about 0 to about 4, X is a halogen and A is hydrogen or the group

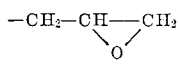

The epoxy resins represented by the Formulae A, B, C and D above may be referred to an epoxy resins of the polyglycidyl ether of polyhydric phenols and alcohols type.

The preparation of the epoxy resins represented by Formulae A, B and C are well known and need not be discussed further. Epoxy resins represented by "D" may be prepared by reacting glycerine with an epihalohydrin in the presence of a Lewis acid and subsequently epoxidizing with an alkali metal hydroxide or carbonate in the conventional manner.

Mixtures of various epoxy resins including those described herein may also be employed in the practice of the present invention. It is understood that it is well known that different properties are obtained with different epoxy resins. This invention encompasses any epoxy resin of the glycidyl ether type containing modifiers as described herein wherein said modified epoxy resin provides for improved adhesion to metals as compared to the adhesion of the same epoxy resin without said modifier. Solid resins having epoxy equivalent weights of up to about 5500 may be used.

The modified epoxy resin compositions of this invention are preferably prepared by addition of the urethane type polymeric modifier to molten epoxy resin, i.e., where the epoxy resin is heated to a temperature generally in the range of 80 to 100° C. although either or both of the polymeric modifier and epoxy resin may be dissolved or dispersed in a suitable solvent or diluent if desired.

The modified epoxy resin of this invention may be blended with most conventional fillers and curing agents.

Suitable curing agents are dicyandiamide, n,n-dimethylaminoethylmethacrylamide, diethylaminopropylamine, aminoethyl piperazine, triethanol amine, aminated polyglycols such as aminated P-250 (a polyoxypropylene glycol having an average molecular weight of about 250), Nadic® Methyl Anhydride, diallylmelamine, and polyamides such as Versamid® 140, 125, 110, and 115 among other and mixtures thereof. Suitable fillers are aluminum, silica, calcium carbonate, clay, organics, etc. (cellulose, wood, flour, etc.).

Methods of preparing the compositions of the present invention and illustration of desirable and unexpected utility thereof, as adhesive coatings for metals, are presented in the following examples.

EXAMPLE (I) Preparation of polymeric modifiers

Type A: One equivalent weight of a polyether polyol of 2000 average molecular weight (P-2000) which was initiated from propylene oxide and monopropylene glycol was reacted with two equivalents of toluene diisocyanate at 120° C. for one hour and then degassed under a vacuum of about 1 mm. Hg. To the prepolymer at 100° C. was added 4-mercaptobutanol (in slight excess) and the temperature held at 140° C. for three hours. This material was characterized by having a molecular weight of 2700, a mercaptan content of 2.44 percent and a functionality of two.

Type B: One equivalent weight of a polyether polyol of 2700 average molecular weight (CP-2700) which was initiated from glycerine and propylene oxide was reacted with two equivalents of toluene diisocyanate as per A above.

Type C: To 200 grams of a polyester polyol containing 1.3 percent OH, which was heated to 80° C. to de-gas, was added 27.3 grams of toluene diisocyanate. The reaction was continued for four hours at 80° C., whereby an isocyanate prepolymer was prepared containing 2.68 percent of free isocyanate groups. To 150 grams of such prepolymer, which had been heated to 100° C., was added 10.15 grams of 4-mercaptobutanol. This mixture was allowed to react 3 hours at 100° C. resulting in a polyurethane polythiol having 1.75 percent SH.

Type D: To 200 grams of a polyester prepared from adipic acid and tripropylene glycol, such polyester containing 1.34 percent reactive OH, was added 27.3 grams of toluene diisocyanate. The reaction was continued at a temperature of 85° C. for a period of 110 minutes to form a product containing 2.68 percent isocyanate. To this product was added 13.30 grams of 4-mercaptobutanol and the admixture reacted at 130° C. for a period of 152 minutes to form a product containing 1.75 percent SH.

Type E: To 100 grams of a polyester prepared from adipic acid and tripropylene glycol, such polyester containing 2.98 percent of reactive OH, was added 30.6 grams of toluene diisocyanate. The reaction was continued at a temperature of 95° C. for 173 minutes to form a product containing 3.20 percent isocyanate. To this product was added 10.5 grams of 4-mercaptobutanol and the admixture reacted at 130° C. for 117 minutes to form a product containing 1.75 percent mercaptan.

Type F: To 100 grams of a hydroxyl terminated butadiene-acrylonitrile polymer composed of 85 percent butadiene and 15 percent acrylonitrile and having 9.69 percent of reactive OH, was added 7.4 grams of toluene diisocyanate and 3.7 grams of phenyl isocyanate. The reaction was continued at a temperature of 25° C. for 24 hours to form a product having 1.8 percent isocyanate. To this product was added 2.86 grams of 4-mercaptobutanol and the admixture reacted at 70° C. for 240 minutes.

Type G: To 140 grams of a mercaptan terminated polybutadiene was added 24.4 grams of toluene diisocyanate and 6.06 grams of phenyl isocyanate. The reaction was continued at a temperature of 25° C. for a period of 24 hours to form a product containing 7.5 percent isocyanate. To this product was added 10.7 grams of 4-mercaptobutanol and the admixture reacted at 70° C. for 50 minutes.

(II) Modification of epoxy resin

In each of a series of experiments varying amounts of one of the polymeric modifiers A through G of (I) was added with stirring to a molten epoxy resin (DER 661) of the formula:

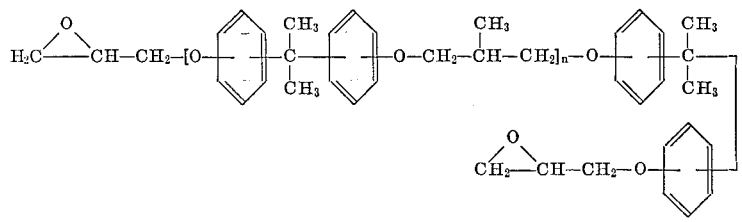

having an epoxy equivalent weight of 522.

(III) Evaluation of the modified epoxy resin in an adhesive formulation

In each of a series of experiments to 100 parts of modified epoxy resin was then separately added the following formulation ingredients:

| | Parts |
|---|---|
| Hardener (dicyandiamide) | 5–10 |
| Silica filler | 2.5–5 |
| Aluminum powder | 70–80 |

Each formulation was then tested as an adhesive for steel by the procedures described by the ASTM Test No. D–1781 (climbing drum peel test) and for aluminum by the ASTM Test No. D–1002 (lap shear test).

All test specimens, unless otherwise noted, were cured 45 minutes at 182° C. All peel samples were cured under a platen pressure of 16.5 lbs./in.$^2$ at 182° C. for 45 minutes.

The following Table I illustrates the compositions tested and the physical property characteristics thereof:

TABLE I

| | Epoxy resin | | | Modifiers | | | | | | Physical Properties, DICY cure | | | |
|---|---|---|---|---|---|---|---|---|---|---|---|---|---|
| Run No. | Type | Epoxy equivalent weight | Grams | Type | Grams | Phr. | SH equivalent weight | Molecular weight | Functional groups | Heat deflection (° F.) | Izod impact | Climbing drum peel, lbs./in. width | Lap shear p.s.i. |
| 1 | DER–661 | 522 | 30 | A | 12 | 40 | 1,350 | 2,700 | 2.00 | 120 | | 63 | |
| 2 | DER–661 | 522 | 30 | A | 6 | 20 | 1,350 | 2,700 | 2.00 | 153 | | 160 | |
| 3 | DER–661 | 522 | 30 | A | 3 | 10 | 1,350 | 2,700 | 2.00 | 172 | | 121 | |
| 4 | DER–661 | 522 | 30 | B | 12 | 40 | 1,300 | 3,900 | 3.00 | 122 | | 87 | |
| 5 | DER–661 | 522 | 30 | B | 6 | 20 | 1,300 | 3,900 | 3.00 | 142 | | 173 | |
| 6 | DER–661 | 522 | 30 | B | 3 | 10 | 1,300 | 3,900 | 3.00 | 178 | | 104 | |
| 7 | DER–661 | 522 | 50 | C | 10 | 20 | 1,400 | 4,375 | 3.00 | 161 | | 101 | |
| 8 | DER–661 | 522 | 50 | D | 20 | 40 | 1,880 | 4,500 | 2.40 | 113 | 0.5 | 97 | 3,925 |
| 9 | DER–661 | 522 | 50 | D | 10 | 20 | 1,880 | 4,500 | 2.40 | 144 | 0.6 | 97 | 4,825 |
| 10 | DER–661 | 522 | 50 | D | 5 | 10 | 1,880 | 4,500 | 2.40 | 167 | 0.6 | 60 | 5,260 |
| 11 | DER–661 | 522 | 50 | E | 20 | 40 | 1,720 | 2,390 | 1.90 | 122 | 0.3 | 53 | 1,600 |
| 12 | DER–661 | 522 | 50 | E | 10 | 20 | 1,720 | 2,390 | 1.90 | 158 | 0.6 | 69 | 2,550 |
| 13 | DER–661 | 522 | 50 | E | 5 | 10 | 1,720 | 2,390 | 1.90 | 181 | 0.6 | 9 | 4,650 |
| 14 | DER–661 | 522 | 50 | F | 10 | 20 | | | | 179 | 0.6 | 71 | 300 |
| 15 | DER–661 | 522 | 50 | G | 15 | 30 | | | | 142 | 0.6 | 105 | 3,650 |
| 16 | DER–331 [1] | 189 | 50 | A | 10 | 20 | 1,350 | 2,700 | 2.00 | | | 92 | |

[1] Same as epoxy resin 661 but wherein $n$ has an average value of about 0.134.

All of the above modified epoxy resin formulations were characterized by improved adhesive characteristics over the non-modified equivalents of such solid epoxy resins.

What is claimed is:

1. A curable resin composition comprising essentially:
(a) an epoxy resin of the polyglycidyl ethers of polyhydric phenols and alcohols type, and
(b) between about 5 and 50 parts per 100 parts of said epoxy resin of a reactive, terminated polymeric modifier for said resin wherein said modifier is the reaction product of
   (1) approximately two molar equivalents of an organic isocyanate,
   (2) approximately one molar equivalent of a polymeric material which is terminated with an active hydrogen capable of reacting with said organic isocyanate, said polymeric material containing one or more flexibilizing groups along the main polymer chain, said flexibilizing groups being selected from the group consisting of $$-O-,\ -S-,\ -O-\overset{O}{\underset{\|}{C}}-,\ -O-\overset{O}{\underset{\|}{C}}-NH-,\ -\overset{O}{\underset{\|}{C}}-NH-$$

$$NH-\overset{O}{\underset{\|}{C}}-NH-,\ -S-\overset{O}{\underset{\|}{C}}-NH-,\ -O-Si-O-$$

and —C=C—C—, said polymeric material having an average molecular weight of from about 500 to 5000, and
   (3) approximately one molar equivalent of a material having the general formula

X—R—X′ wherein X and X′ is selected from the group consisting of SH, OH, NH$_2$ and COOH and wherein R is selected from the group consisting of alkyl, aryl, aliphatic, aromatic and branched aliphatic;

wherein said polymeric modifier has an average molecular weight of at least 500 but less than 5000 and is compatible with said epoxy resin.

2. The composition of claim 1 wherein said epoxy resin is a normally solid epoxy resin.

3. The composition of claim 2 wherein (3) is 4-mercapto-butanol.

4. A method of enhancing the adhesive properties of thermosettable epoxy resins comprising
(I) admixing prior to curing
   (a) an epoxy resin of the polyglycidyl ethers of polyhydric phenols and alcohols type with
   (b) between about 5 and 50 parts per 100 parts of said epoxy resin of a reactive, terminated polymeric modifier for said resin wherein said modifier is the reaction product of
      (1) approximately two molar equivalents of an organic isocyanate,
      (2) approximately one molar equivalent of a polymeric material which is terminated with an active hydrogen capable of reacting with said organic isocyanate, said polymeric material containing one or more flexibilizing groups along the main polymer chain, said flexibilizing groups being selected from the group consisting of $$-O-,\ -S-,\ -O-\overset{O}{\underset{\|}{C}}-,\ -O-\overset{O}{\underset{\|}{C}}-NH-,\ -\overset{O}{\underset{\|}{C}}-NH-$$

$$-NH-\overset{O}{\underset{\|}{C}}-NH-,\ -S-\overset{O}{\underset{\|}{C}}-NH-,\ -O-SE-O-$$

and —C=C—C—, said polymeric material having an average molecular weight of from about 500 to 5000, and
      (3) approximately one molar equivalent of a material having the general formula

X—R—X′ wherein X and X′ is selected from the group consisting of SH, OH, NH$_2$ and COOH and wherein R is selected from the group consisting of alkyl, aryl, aliphatic, aromatic and branched aliphatic;

wherein said polymeric modifier has an average molecular weight of at least 500 but less than 5000 and is compatible with said epoxy resin, then
(II) curing the modified epoxy resin.

5. The method of claim 4 wherein said epoxy resin is a normally solid epoxy resin in molten form.

6. The method of claim 5 wherein (3) is 4-mercaptobutanol.

References Cited

UNITED STATES PATENTS

| | | | |
|---|---|---|---|
| 3,012,984 | 12/1961 | Hudson | 260—835 |
| 3,148,167 | 9/1964 | Keplinger | 260—830 |
| 3,158,586 | 11/1964 | Krause | 260—830 |
| 3,238,273 | 3/1966 | Hampson | 260—830 |
| 3,239,580 | 3/1966 | Pendleton | 260—830 |
| 3,290,208 | 12/1966 | Lewis | 260—830 |
| 3,309,261 | 3/1967 | Schiller | 260—830 |
| 3,324,974 | 6/1967 | Champlin | 260—830 |
| 3,380,950 | 4/1968 | Blomeyer | 260—830 |

FOREIGN PATENTS

| | | |
|---|---|---|
| 763,347 | 12/1956 | Great Britain |
| 127,390 | 6/1959 | U.S.S.R. |

PAUL LIEBERMAN, Primary Examiner

U.S. Cl. X.R.

260—2 Ep, 2 Ec, 13, 18 PN, 18 TN, 37 Ep. 37 N, 41 R, 47 Ep, 47 EN, 47 EC, 77.5 AM, 77.5 AP, 77.5 CR, 830 P, 830 S, 835, 836, 837 R